United States Patent [19]
Savage et al.

[11] 3,715,170
[45] Feb. 6, 1973

[54] COOLED TURBINE BLADE

[75] Inventors: Joseph W. Savage; Henry J. Brands; Richard H. Anderson, all of Cincinnati, Ohio

[73] Assignee: General Electric Company, Cincinnati, Ohio

[22] Filed: Dec. 11, 1970

[21] Appl. No.: 97,226

[52] U.S. Cl. ................................................416/97
[51] Int. Cl. ................................................F01d 5/18
[58] Field of Search........416/96, 97, 90, 92, 95, 224; 415/115

[56] References Cited

UNITED STATES PATENTS

| | | | |
|---|---|---|---|
| 2,650,803 | 9/1953 | Rosskopf | 416/92 X |
| 2,873,944 | 2/1959 | Wiese et al. | 416/97 |
| 2,879,028 | 3/1959 | Stalker | 416/90 |
| 3,032,314 | 5/1962 | David | 416/90 |
| 3,269,119 | 8/1966 | Price | 416/96 A UX |
| 3,301,527 | 1/1967 | Kercher | 415/115 |
| 3,574,482 | 4/1971 | Savage et al. | 416/96 UX |

FOREIGN PATENTS OR APPLICATIONS 187,346   10/1956   Austria ...............................416/96 A

*Primary Examiner*—Everette A. Powell, Jr.
*Attorney*—Derek P. Lawrence, Lee H. Sachs, Frank L. Neuhauser, Oscar B. Waddell, Joseph B. Forman and James M. Kipling

[57] ABSTRACT

An air-cooled turbine blade has a circular arc mounting tang generally aligned with a cambered airfoil portion. The latter is of thin-walled construction, including an integral tip wall, defining an internal cavity. A pair of inserts are inserted through radial passageways on the tang to project into this cavity. Cooling air passes to the inserts and is discharged therefrom through a multiplicity of holes to impinge the cavity walls and enhance the convection cooling thereof.

8 Claims, 3 Drawing Figures

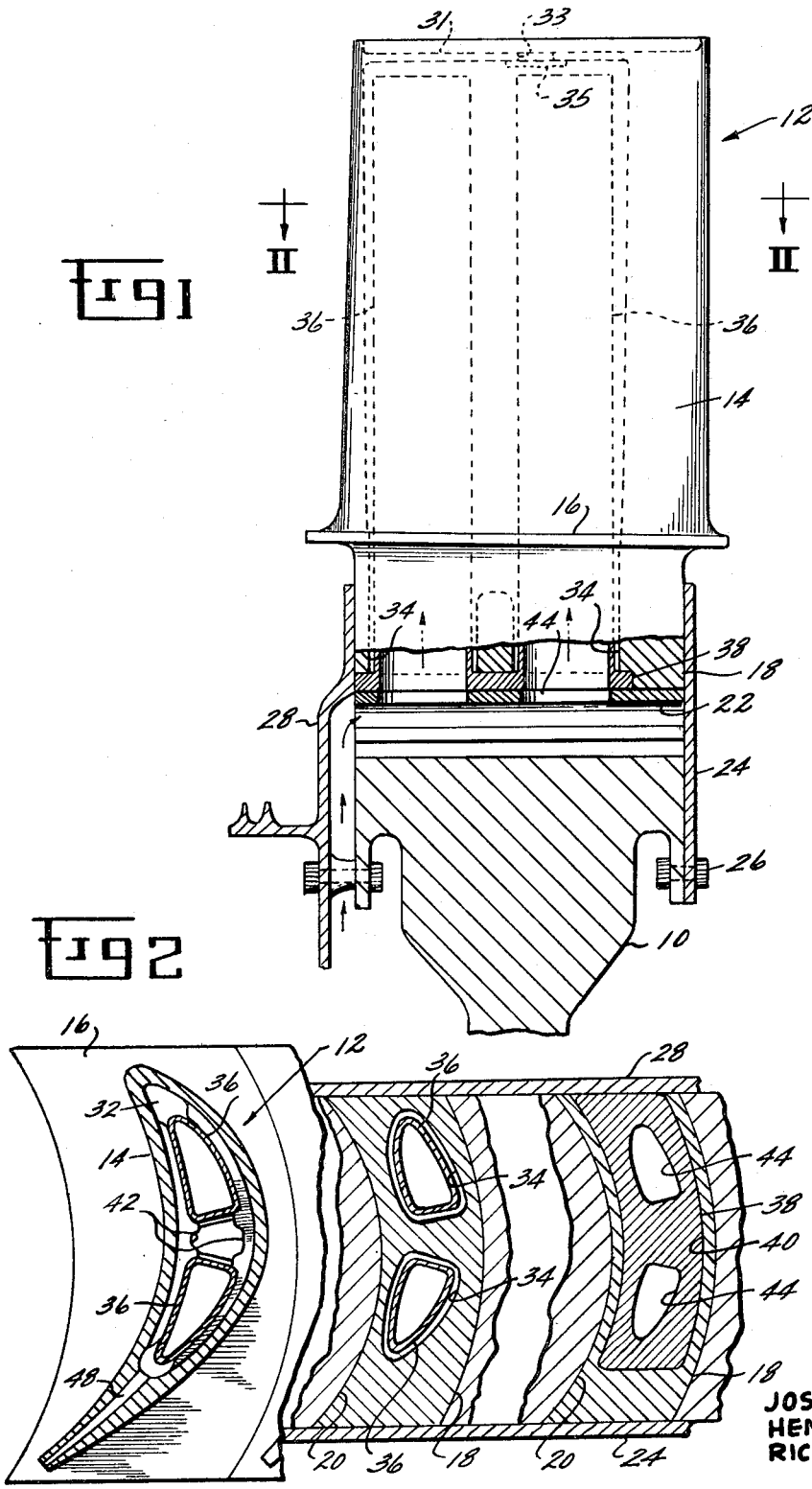

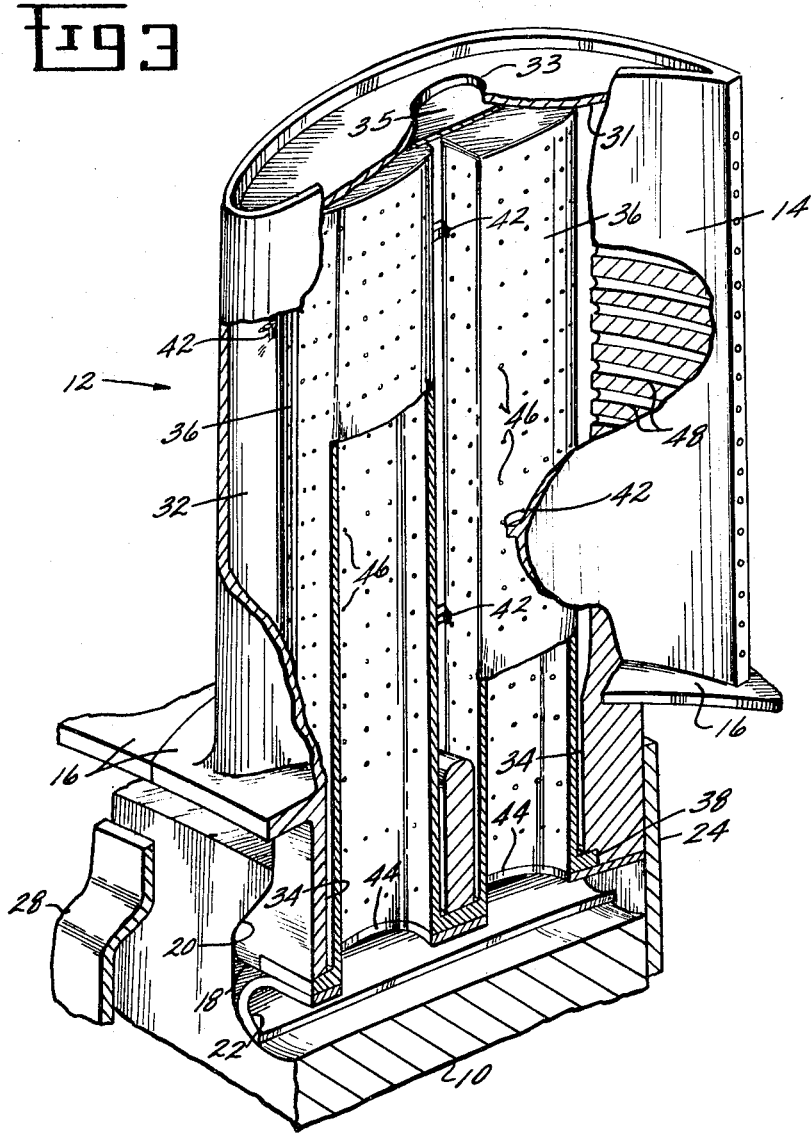

COOLED TURBINE BLADE

The present invention relates to improvements in air-cooled blades used in high temperature turbines. The invention herein described was made in the course of or under a contract, or a subcontract thereunder, with the United States Department of the Air Force.

In high performance gas turbine engines, the temperature of the hot gas stream generated exceeds the operating temperature capability of any practical material from which the turbine vanes and blades could be fabricated. In order to reduce metal temperatures to a point where sufficient strength is maintained, it has become an accepted practice to duct lower temperature, pressurized air from the engine's compressor to these turbine components which operate in the hot gas stream environment.

The cooling air thus derived has been employed in various ways to reduce the metal temperatures of such components. Basically, there are two cooling mechanisms generally involved as cooling air is introduced into hollow blade or vane and then discharged into the hot gas stream. The flow of cooler air through the hollow structures (or passageways therein) reduces the metal temperature by convection. The second cooling mechanism may be obtained by discharging the cooling air from a plurality of points around the surface of the hollow body to form a thin layer of air on its exterior surface. This mechanism, known as film cooling, further reduces metal temperatures permitting operation in higher temperature gas streams.

These cooling mechanisms for blades and vanes can be further enhanced by an impingement action, or impingement cooling. This involves the provision of a shell-like insert within the hollow body and spaced from the interior surfaces thereof. Cooling air is first introduced into the insert and then discharged therefrom through small holes toward the interior surface of the hollow body. The air is thus discharged as a plurality of jets having reduced temperatures and greater convective cooling effectiveness.

The provision of inserts for impingement cooling of static parts is relatively straight forward from an assembly standpoint. However, in rotating components, and particularly the blades of turbine rotors, great difficulties have been encountered. The primary source of these difficulties is that these inserts must be anchored in fixed relation to the blades. The provision of such inserts has been a real challenge considering other requirements of turbine blades as the need for a tang-dovetail attachment of the blades to a turbine rotor. Further, in high temperature operation it is highly desirable to eliminate brazing or bond joints that are loaded in shear or tension due to centrifugal force. This is particularly true at the tip endwall. Previous efforts in this area have been relatively expensive and have limited operating capabilities due to the weight involved as well as certain bonding techniques that have been employed. Another drawback to most, if not all, previous proposals has been that the insert and the blade have been permanently joined so that visual inspection of the insert and blade interior is not possible without destroying the blade.

Accordingly, one object of the present invention is to provide impingement cooling, inserts in tanged turbine blades in a simple, reliable and economical fashion and in so doing, provide for disassembly of the inserts to enable visual inspection thereof as well as the interiors of the blades.

Another object of the invention is to attain the above ends and in so doing to obviate the need for braze or similar joints which would be loaded in shear or tension due to centrifugal forces of rotation.

In the broader aspects of the invention these ends are attained by a turbine blade having a thin-walled, cambered airfoil portion, defining an internal cavity and a single, circular arc dovetail integral therewith. The tang, which provides for attachment of the blade to a turbine rotor, is curved to approximate the camber of the airfoil portion and generally aligned therewith. An insert extends outwardly from and through a radial passageway formed in the tang, into the cavity of the airfoil portion. The insert is insertable through this passageway and has a multiplicity of holes directed toward surfaces of the cavity. An inlet opening at the inner end of the insert admits cooling air which is discharged from the insert holes to impinge the cavity surfaces and cool same. This cooling air is then discharged from the blade cavity.

Other preferred features are found in mounting the insert as a loose assembly to facilitate inspection and replacement. Also, a plurality of inserts may be employed to give added tang strength and impingement action on substantially all of the cavity surfaces. Additionally means are provided for positioning the insert in spaced relation to the cavity and the passageway for impingement cooling thereof.

The above and other related objects and features of the present invention will be apparent from a reading of the following description of the disclosure found in the accompanying drawings and the novelty thereof pointed out in the appended claims.

In the drawings:

FIG. 1 is a fragmentary, generally longitudinal section through a turbine rotor and blade embodying the present invention;

FIG. 2 is a section taken on line II in FIG. 1 with portions thereof progressively broken away;

FIG. 3 is a fragmentary, perspective view of the blade and rotor broken generally along the median camber line of the blade.

FIGS. 1 – 3 illustrate a turbine rotor disc 10 having radially projecting turbine blades 12 mounted in a circumferential row thereon. Each blade comprises a cambered airfoil portion 14 which projects into the hot gas stream of the turbine. A platform 16 is provided at the base of each airfoil portion to compositely define the inner bounds of the hot gas flow through the blade row. A tang 18 extends inwardly of the platform to attach the blade to the rotor disc.

The tangs 18 are of the single dovetail circular arc type and are preferably formed with their opposite sides defined by radii swung from different centers as taught in U.S. Pat. No. 3,378,230, which is of common assignment with the present application. The disc 10 has correspondingly shaped grooves 20, formed across its circumferential face, which receive the tangs to mount the blades 12.

The grooves 20 have a depth greater than the dovetail height of the tangs 18 to facilitate insertion of the tangs therein. Since the grooves and tangs are not respectively formed on radii swung from a common center, the tangs must be inserted in the lower portions of the grooves and then shifted radially outwardly to lock the blades in place. The blades are held in this locked position by spacers 22 inserted into the spaces between the bottoms of the tangs 18 and the bottoms of the grooves 20.

The spacers 22 are formed of sheet metal or other openwork construction to maintain a substantial cooling air chamber beneath each tang 18. The downstream side of this chamber is sealed by a ring 24 which is secured to the disc 10 by bolts 26. An annular plate 28 is secured to the upstream side of the disc 10 by bolts 30. The peripheral portion of the plate 28 sealingly engages the upstream sides of the disc and tangs while, the inward portions of the plate 28 are spaced from the disc to provide a flow-path for cooling air from the upstream side of the inner portion of the disc to the cooling air chambers beneath each blade tang. Pressurized cooling air may be ducted to the disc 10 in many ways well known to those skilled in the art. Also, there are other ways known to introduce cooling air to the chambers beneath the blade tangs.

The airfoil portion 14 of each blade is a thin-walled shell having a tip endwall 31 defining an internal cavity 32. For maximum strength, the tip wall 31, or its major portion, is formed integrally with the airfoil portion 14. This may be done in accordance with the teachings of U.S. patent application Ser. No. 793,434, filed Jan. 23, 1969, and of common assignment. In accordance with that application, a core supporting hole 33 is formed in the endwall 31 and sealed by an underlying, brazed plate 35. The braze joint therefor is not subjected to shear or tensile loads of a substantial nature. Radial passageways 34 extend from the bottom of the blade tang 18 into the cavity 32.

A pair of inserts 36 are inserted through the passageways 34 in project within the cavity 32 to a point adjacent to and spaced from the endwall 31. The cross section of these inserts approximates the opposed contours of the cavity 32 and passageways 34 and are spaced therefrom. In connection with the varying contours of the inserts 36, it will be noted that they are nonetheless insertable through the passageways 34.

Preferably, the inserts 36 are joined to a common flange or base plate 38 that is received in a recess 40, in the bottom surface of the tang, which registers the inner ends of the inserts relative to the passageways 34 and limits their outward positions. The flange 38 also limits admission of cooling air, from beneath the tang, to the interiors of the inserts 36. Chordwise extending ribs 42 project inwardly from the opposite walls of the cavity 32 and are contoured to position the inserts within this cavity in spaced relation to the walls thereof. Preferably, the ribs 42, on opposite sides of the cavity 32, are radially offset. The ribs 42 also serve to minimize transverse blade vibration during operation of the turbine.

The inserts 36 are held in the described, loosely assembled relation by the spacer 22.

The passageways 34, for maximum tang strength, are spaced apart so that there is a rib of tang material therebetween. Further, there is a preferred ratio of the passageway cross section length (relative to tang length) to width, namely between approximately 1.5 to 2.5/1.

In operation, cooling air flows from the chambers beneath the blade tangs, through apertures 44, in the spacers 22, into the plenums defined by the interiors of the thin-walled inserts 36. This air is then impinged against the walls of the cavity 32 through a multiplicity of relatively small holes 46 which are selectively formed through the inserts 36. Note that the holes 46 are formed only in the portions of the inserts opposed to the wall portions of the cavity, there being no need to form holes in the portions of the inserts opposed to each other.

It is also preferred that the inserts be spaced from the passageways 34 and that holes 46 be provided in the inner portions of the inserts to impinge cooling air thereagainst.

The cooling air impinged against the walls of cavity 32 must be discharged from the cavity to maintain a continuous flow of cooling air. In so doing, the discharged air is employed to obtain further cooling action. As a first preference, the air is discharged through holes 48 extending through the trailing edge portion of the airfoil 14. This portion operates at a relatively high temperature and is relatively thick in a chordwise direction so that this preferential cooling is desirable. Additional holes may be formed through the walls of the airfoil and other means employed to provide further convection and film cooling therefor in accordance with known techniques to meet the environmental requirements for a given turbine.

The advantages of the present invention are in the provision of an impingement cooling insert which provides impingement cooling to at least substantially the entire cavity surface of a highly cambered turbine blade airfoil. The blade may be conventionally formed as a casting with little or no machining required. The inserts may also be formed as castings or otherwise fabricated by conventional techniques, with or without a common base or flange. Assembly, as will be apparent, is simplicity itself. While the described loose assembly is preferred for inspection and maintenance purposes, the inserts could be bonded in place. Also, in some cases a single insert, in accordance with the above, could provide sufficient cooling.

From the preceding it will be apparent the deviations from the preferred embodiment described will occur to those skilled in the art. The spirit and scope of the present invention is therefore to be derived solely from the following claims.

Having thus described the invention, what is claimed as novel and desired to be secured by Letters Patent of the United States is:

1. A turbine blade adapted to be mounted in radially projecting relationship on a turbine rotor, said blade comprising an outer cambered airfoil portion formed with a thin wall and tip end wall defining an internal cavity, a single dovetail tang integral with the inner end of said airfoil portion and generally aligned centrally therewith and having a curvature approximating the camber of the airfoil portion, said tang having a passageway extending radially therethrough from the bottom surface thereof to said cavity, a thin-walled, hollow insert insertable through said passageway and extending from the lower end of and through said passageway, into said cavity and terminating adjacent said tip end wall, said insert having an inlet in its lower end for the admission of cooling air to its interior, said insert having a multiplicity of relatively small holes therethrough which are directed toward surfaces defining said cavity, and impinge cooling air thereagainst, said insert being loosely assembled within said tang passageway and thereby removable therefrom and also including a flange at its lower end engageable with the bottom of the tang to position the insert in a radially outward direction relative to said blade, and means for discharging cooling air from said cavity.

2. A turbine blade as in claim 1 wherein the insert is spaced from said tang passageway and has relatively small holes therethrough for impinging cooling air against said passageway and the insert flange is formed peripherally thereof and engages the bottom of the tang to thus limit admission of cooling air to passage through the insert and further, the bottom of the tang includes means cooperative with the insert flange to position the lower end thereof in spaced relation from said passageway.

3. A turbine blade as in claim 2 further comprising means for positively spacing the portion of the insert within the cavity from the surfaces thereof.

4. A turbine blade as in claim 3 wherein at least the major portion of the tip endwall is formed integrally with said airfoil portion.

5. A turbine blade adapted to be mounted in radially projecting relationship on a turbine rotor, said blade comprising an outer cambered airfoil portion formed with a thin wall and a tip end wall defining an internal cavity, a single dovetail tang integral with the inner end of said airfoil portion and generally aligned centrally therewith and having a curvature approximating the camber of the airfoil portion, said tang having at least two passageways extending radially therethrough from the bottom surface thereof to said cavity, a thin-walled, hollow insert insertable through each of said passageways and extending from the lower end thereof and through said passageways, into said cavity and terminating adjacent said tip end wall, each of said inserts having an inlet in its lower end for the admission of cooling air to its interior, each of said inserts having a multiplicity of relatively small holes therethrough which are directed toward surfaces defining said cavity and adapted to impinge cooling air thereagainst, and means for discharging cooling air from said cavity.

6. A turbine blade as in claim 5 wherein said passageways have a length (relative to the dovetail length) to width ratio between approximately 1.5 to 2.5/1.

7. A turbine blade as in claim 5 wherein the inserts are loosely assembled and have a common base flange engageable with the bottom of the tang to position the inserts in a radially outward position relative to said airfoil portion.

8. A turbine blade as in claim 7 wherein said inserts are spaced from their respective passageways and have relatively small holes therethrough for impinging cooling air against said passageways said common base flange seals against the bottom of said tang to thus limit admission of cooling air to passage through said inserts, the bottom of the flange is recessed and the base flange is received by said recess and positions the lower ends of the inserts in spaced relation from their respective passageways, and chordwise extending ribs project from opposite wall surfaces of said cavity and position the upper ends of said inserts, said ribs being radially offset on said opposite walls.

* * * * *